United States Patent
Geltsch et al.

(12) 
(10) Patent No.: US 6,476,703 B2
(45) Date of Patent: Nov. 5, 2002

(54) CONTROL UNIT OF A VALVE MECHANISM

(75) Inventors: Hans-Otto Geltsch, Rohr (DE); Josef Koiner, Pommelsbrunn (DE)

(73) Assignee: Framatone Connectors International, Courbevoie (FR)

(*) Notice: Subject to any disclaimer, the term of this patent is extended or adjusted under 35 U.S.C. 154(b) by 0 days.

(21) Appl. No.: 09/769,236

(22) Filed: Jan. 24, 2001

(65) Prior Publication Data

US 2001/0019920 A1 Sep. 6, 2001

(30) Foreign Application Priority Data

Jan. 25, 2000 (DE) .......................... 100 03 055

(51) Int. Cl.⁷ .............................................. H01E 27/29
(52) U.S. Cl. ..................... 336/192; 336/90; 336/96; 336/208; 336/107; 335/298; 335/278; 335/208
(58) Field of Search .................. 336/192, 208, 336/90, 96, 107; 335/278, 298, 296, 208

(56) References Cited

U.S. PATENT DOCUMENTS

| | | | |
|---|---|---|---|
| 5,374,114 A | 12/1994 | Burgdorf et al. | 303/119.2 |
| 5,977,852 A | * 11/1999 | Schoettl | 335/278 |
| 5,999,079 A | * 12/1999 | Wille | 336/192 |

FOREIGN PATENT DOCUMENTS

| | | |
|---|---|---|
| DE | 3742320 A1 | 6/1989 |
| DE | 4015564 A1 * | 5/1990 |
| DE | 3926454 C2 | 2/1991 |
| EP | 0394833 A1 | 10/1990 |

* cited by examiner

Primary Examiner—Elvin Enad
Assistant Examiner—Jennifer A. Poker
(74) Attorney, Agent, or Firm—Perman & Green, LLP

(57) ABSTRACT

The invention describes a control unit of a valve mechanism with an electromagnetic coil (1) where the electromagnetic coil (1) is electrically and mechanically connected to the control unit via a connection device which has an electrically conducting spring-mounted connecting ridge (10).

8 Claims, 3 Drawing Sheets

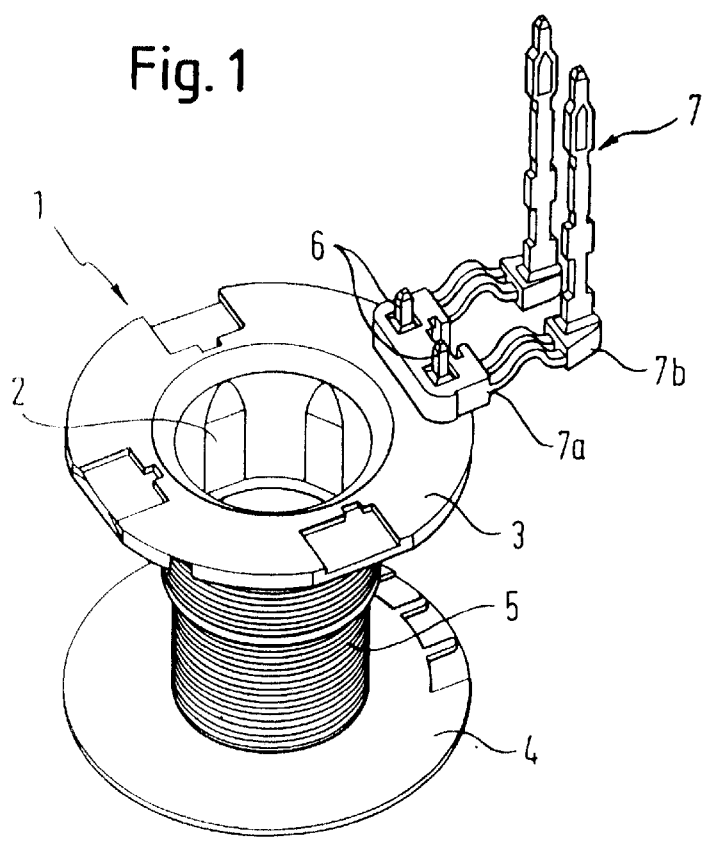
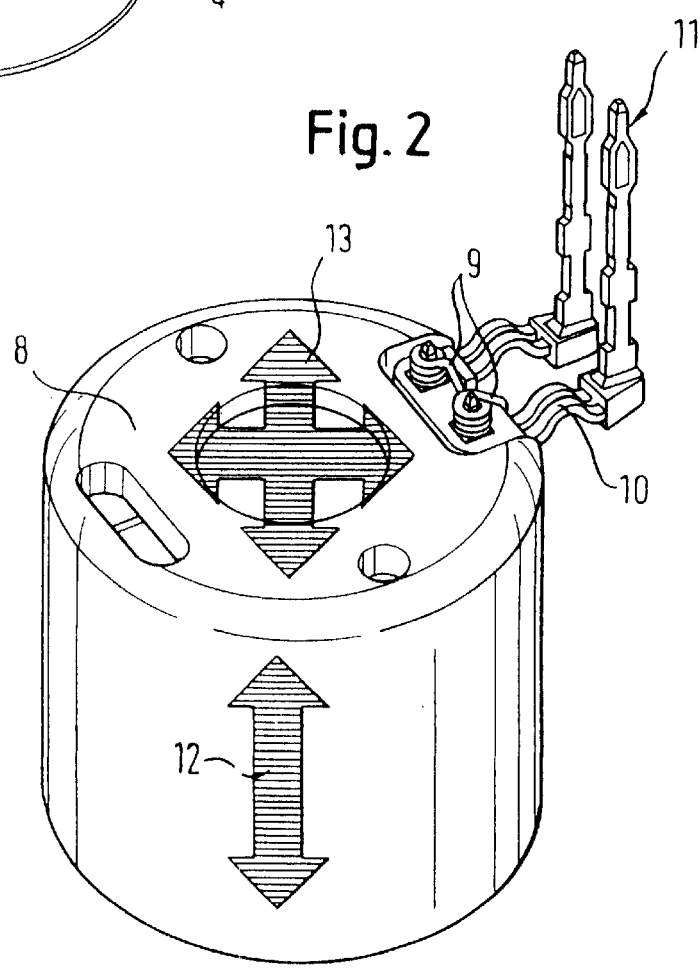

CONTROL UNIT OF A VALVE MECHANISM

BACKGROUND OF THE INVENTION

1. Field of the Invention

The present invention concerns a control unit of a valve mechanism, which has an electromagnetic coil.

2. Description of Prior Developments

Control units for electromagnetically operable hydraulic valves are encountered ever more frequently in technology, particularly in antilock systems in the automotive industry. A particular faculty of application of the said control unit exists in the automotive industry in antilock systems (ABS) and antiskid devices. In order to control the various systems, the control unit monitors, for example, the skid behavior of the wheel of a passenger vehicle. If, for example, there is a risk that the wheel might lock during the process of braking, this is detected by sensors on the wheel and transmitted to the control unit; to this control unit are linked several electromagnetically operable hydraulic valves. These valves are arranged in units (valve blocks) and in order to avoid situations in the vehicle which can no longer be controlled, the control unit controls the brake circuit in such a way that before a wheel locks, the force of braking is reduced by means of bringing about the opening and closing of the hydraulic valve, until the danger of a wheel lock has been removed.

The valve blocks, which consist of several electromagnetic valves have, as a rule, a valve reception body, a housing, as well as a cover for closing the housing. The housing has openings for the reception of the contact pins of the electromagnetic coils, which are located in the housing. These contact pins are fastened directly to the printed circuit boards, which transmit signals for the control of the hydraulic valves.

It is important in the case of such control units that the complete control unit should be shielded from outside influences, so that good sealing of the said unit is ensured during assembly. In doing so, the fitting of the housing on the valve block presents problems, because only very small tolerances are available for the fastening and connection of the coils to the electronic printed circuit boards.

DE 37 42 320 A1 describes a valve block with several electromagnetically operable hydraulic valves, which has a cover with electrical conductors and conductor strips made from brass sheet and located in the said cover, the conductors being fitted with contact elements which, on the cover being fitted on the valve block, are brought into contact with the contact elements of the electromagnetic valve coils.

U.S. Pat. No. 5,374,114 describes an electro-hydraulic pressure control (device with several electromagnetically operable hydraulic valves where the coils are flexibly arranged flexibly on a carrier via an elastic plastic fixing device.

A drawback of the aforementioned state-of-the-art resides in the fact that an elastic suspension of the coils is needed for the state-of-the-art control unit and that the holes in the housing cover for the reception of the coil contacts to the printed circuit boards exhibit play, making the said opening difficult to cover.

SUMMARY OF THE INVENTION

It is accordingly the purpose of the present invention to make possible the economical and simple construction of a control unit for a tightly sealable valve mechanism, whilst conserving large tolerances.

According to the present invention, this purpose is accomplished by the fact that the electromagnetic coil is connected electrically and mechanically to the control unit via a connection device, which has at least one spring-mounted connecting ridge.

This has the advantage that during assembly, that is to say during the fitting of the housing containing the electronic unit on the hydraulic unit via the spring-mounted connecting ridge, a greater degree of clearance is possible. The electrically conducting spring-mounted connecting ridge serves to compensate axial and radial forces when the coils are connected to the control unit, that is to say, when the housing is fitted on the hydraulic unit. The connecting ridge serves simultaneously as an electrical contact for connection to the printed circuit board and for the compensation of inaccuracies in manufacture.

For improved spring action, the spring-mounted connecting ridge can have a first undulating sector, which is arranged between a wire connection sector and a contact sector. Furthermore, the connecting ridge can be arranged substantially at right angles to the axis of the electromagnetic coil where the contact pin lies parallel to the axis of the coil.

In this way, clearance during manufacture can be increased in the direction of insertion of the contact pin.

To achieve a greater degree of stiffness of the spring-mounted connecting ridge, the connection device can have an insulating ridge, which supports the connecting ridge and where the insulating ridge has a second undulating sector. This insulating ridge increases the stiffness of the spring-mounted connecting ridge.

Furthermore, the connecting ridge can be fitted to a coil end. The contact pin and the connecting ridge can substantially lie at right angles to one another.

Furthermore, the coil can have a spool holder with collars, where the connecting ridge has a first step, which is cast into one of the collars.

Furthermore, the insulating ridge can be a part of the collar and project beyond the latter, where the insulating ridge has a first area enclosing the first step and a second area formed around a second step where the second undulating sector connects the first area with the second area.

Furthermore, the contact ridge and the contact pin can be connected with one another via a sealing shoulder. This sealing shoulder makes it possible to seal the control unit after the housing has been pierced by the contact pin.

BRIEF DESCRIPTION OF THE DRAWINGS

Below, an example of an embodiment of the invention is more fully explained by reference to the appended drawings:

FIG. 1 shows the electromagnetic coil with the connection device and the contact pin;

FIG. 2 shows the coil from FIG. 1 in a metal housing;

DESCRIPTION OF THE PREFERRED EMBODIMENTS

Figure 3A:
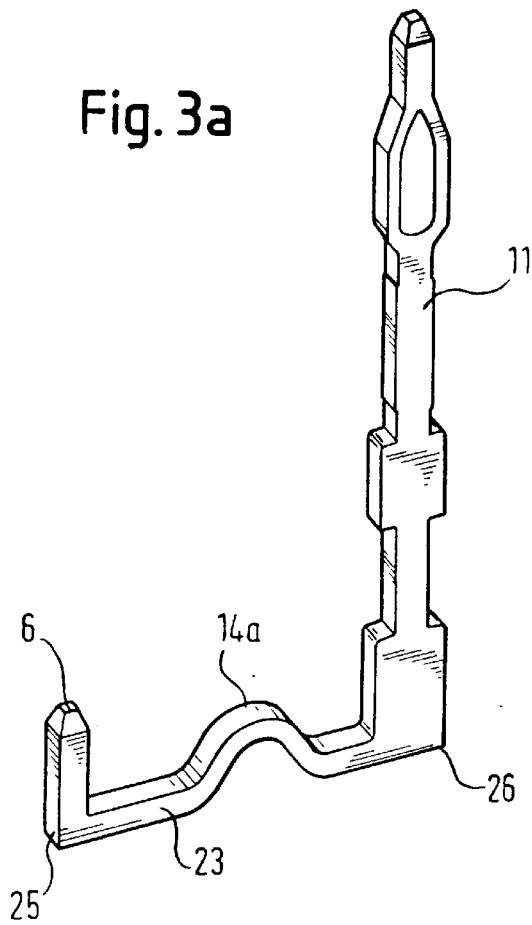
FIG. 3a shows a part of the connection device and of the contact pin.

FIG. 1 shows coil 1 which has a coil holder 2 for the reception of a hydraulic valve. The coil 1 has at its upper end a collar 3 and at its lower end a collar 4 and a wire winding 5. To the upper end 3 are formed in two electrically conducting pins 6 on which is inserted the connection device 7 for connection to the printed circuit board (not shown) which has a wire connection sector 7a and a contact sector 7b.

FIG. 2 shows the electromagnetic coil after it has been fitted during the process of manufacture in a metal housing 8. Furthermore, the ends 9 of the coil winding are shown, which are wound on the electrically conducting pin 6 and so form an electrical contact between the wire winding 5 and a connecting device 7. The connection device 7 consists of an undulating connection ridge 10, the contact pin 11 and electrically conducting pins 6. This contact pin 11 passes through an opening of a printed circuit board and is fastened to the said board, where the position of the contact pin 11 is laid down in relation to the printed circuit board. Through the undulating connection ridge 10 a flexible area now forms in an axial direction represented by the arrow 12 and also a flexible area in a radial direction represented by the arrow 13.

FIG. 3a represents the electrically conducting part of the connection device 7. The electrically conducting pin 6 runs parallel with the contact pin 11, where the connection ridge 10 has a laminia 23 with an undulating sector 14a, a first step 25 and a second step 26.

Figure 3B:
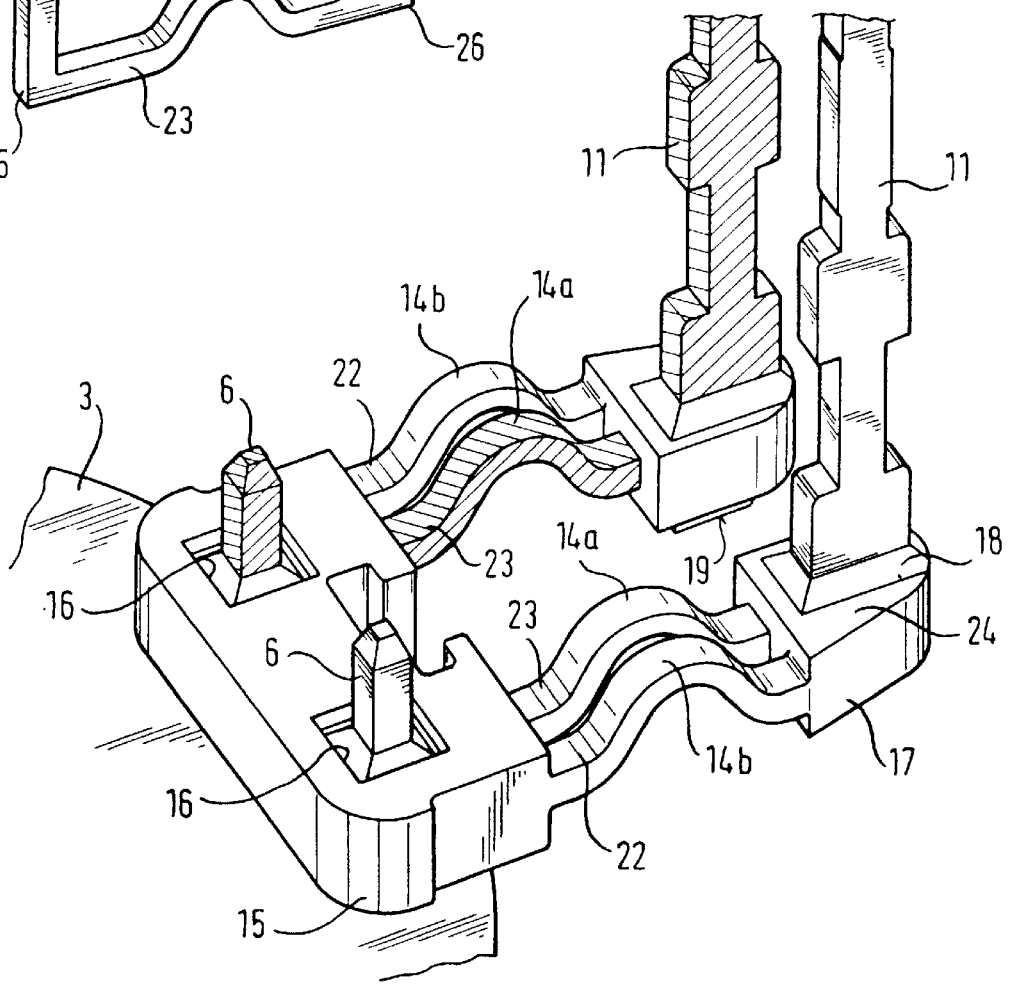
FIG. 3b is an enlarged section of the connection device and contact pin.

FIG. 3b is an enlargement of a part of the connection device 7. On the collar 3 of the coil are arranged both the electrically conducting pins 6, which form the electrical connection between the pin 6 and the contact pin 11. Parallel to the lamina 23 runs the insulating ridge 22 with a second undulating sector 14b, which is made of a plastic material. For better comprehension, the sector in FIG. 3a is shown cross-hatched. On the collar 3 is furthermore arranged a first area 15 which has two openings 16 for the reception of the electrically conducting pins 6. The first area 15 is connected with a second area 17 through the insulating ridge 22, which has a sealing shoulder 24 and which completely encloses the second step 26 of the contact pin 11 and has a collar 18. This collar 18 serves as a seal, when the contact pin 11 is introduced into an aperture provided for that purpose in the printed circuit board. By means of these plastic parts, the spring-mounted connection between the coil and the contact pin 11 is stiffened. At the lower end, the second area 17 has a supporting surface 19.

Figure 4:
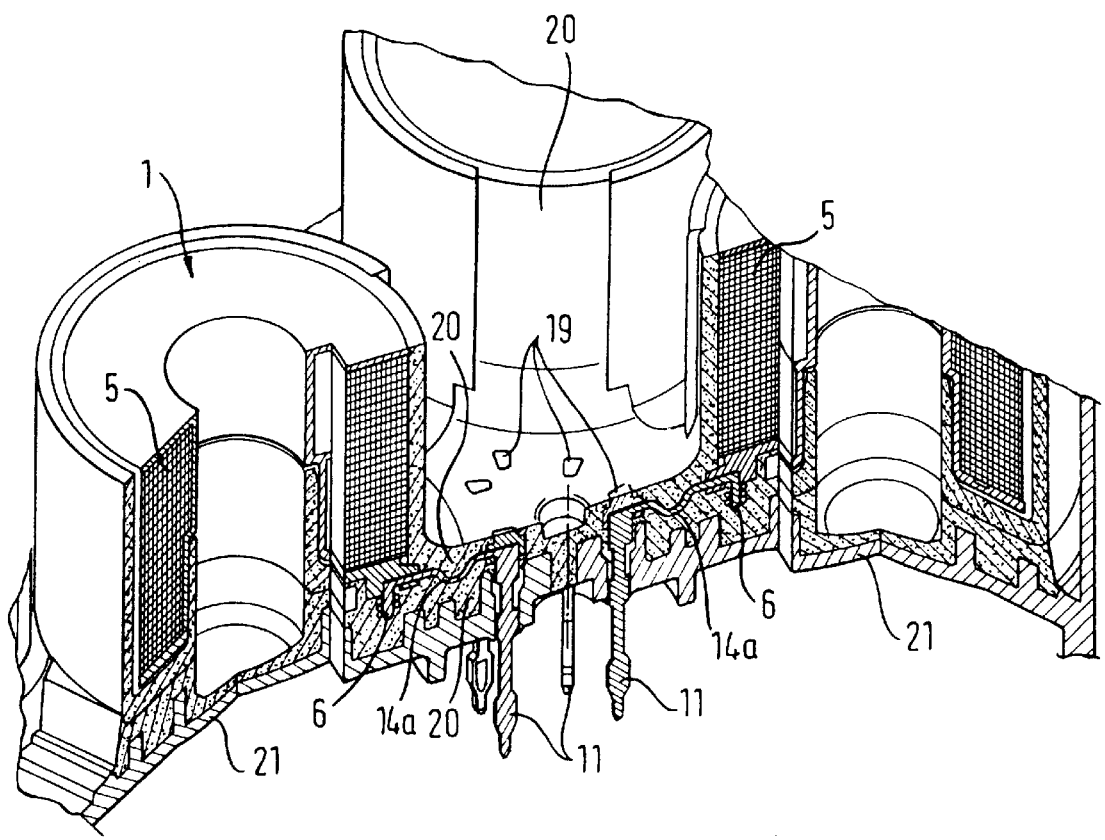
FIG. 4 shows in section a valve block with incorporated coils.

FIG. 4 shows in section a part of the control unit. The coils 1 with winding 5 and the housing 21 are sprayed with a layer of thermoelastic rubber 20 (such as Santoprene). In the section shown, it is possible to see that the undulating sector 14a has been cast into the thermoelastic rubber coating where the electrical pin 6 is connected to the coil and the contact pin 11 is introduced into a printed circuit board (not shown). Furthermore, the supporting surface 19 is shown on the underside of the collar 18 as it extends from the thermoelastic rubber coating and forms a pressure surface. It is possible to fit an object on this pressure surface 19 to form a thrust bearing when the contact pin 11 is introduced into the printed circuit board.

Summarising, the invention makes it possible to create a control unit of a valve mechanism which, through an electrically conducting, spring-mounted connection ridge, forms a flexible contact between the coil and the printed circuit board. This makes possible greater manufacturing tolerances for the position of the coils in relation to the contact pins during the process of manufacture.

What is claimed is:

1. A control unit of a valve mechanism with an electromagnetic coil, wherein the electromagnetic coil is electrically and mechanically connected to the control unit via a connection device which has a spring-mounted connection ridge, the connection device also including an insulating ridge which supports the connection ridge.

2. A control unit according to claim 1, wherein said connection ridge has a first undulating sector which is arranged between a wire connection sector and a contact sector.

3. A control unit according to claim 1, wherein said connection ridge is substantially arranged at right angles to the axis of said electromagnetic coil.

4. A control unit according to claim 1, wherein said insulating ridge has a second undulating sector.

5. A control unit according to claim 1, wherein said connection ridge is located at an end of a coil.

6. A control unit according to claim 1 wherein said coil has a coil carrier with collars where said connection ridge has a first step which is cast into one of the collars.

7. A control unit according to claim 6, wherein said insulating ridge is a part of said collar, and projects beyond the latter and has a first area which encloses said first step and a second area which is formed around a second step where a second undulating sector connects the first area with the second area.

8. A control unit according to claim 1, wherein said connection between said contact ridge and a contact pin includes a sealing shoulder.

* * * * *